United States Patent
Park et al.

(10) Patent No.: US 8,243,613 B2
(45) Date of Patent: Aug. 14, 2012

(54) METHOD AND APPARATUS FOR ESTIMATING VELOCITY OF MOBILE STATION USING CHANNEL QUALITY INDICATOR IN A MOBILE COMMUNICATION SYSTEM

(75) Inventors: Sung-Woo Park, Suwon-si (KR); June Moon, Seoul (KR); Jang-Hoon Yang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 440 days.

(21) Appl. No.: 11/946,471

(22) Filed: Nov. 28, 2007

(65) Prior Publication Data
US 2008/0130512 A1 Jun. 5, 2008

(30) Foreign Application Priority Data
Nov. 28, 2006 (KR) .................. 10-2006-0118596

(51) Int. Cl.
*G01R 31/08* (2006.01)

(52) U.S. Cl. ......................... 370/252; 455/69

(58) Field of Classification Search .................. 709/232
See application file for complete search history.

(56) References Cited

U.S. PATENT DOCUMENTS

| | | | | |
|---|---|---|---|---|
| 2003/0204615 | A1* | 10/2003 | Wei et al. | 709/232 |
| 2006/0286974 | A1* | 12/2006 | Gore et al. | 455/422.1 |
| 2007/0066242 | A1* | 3/2007 | Yi et al. | 455/69 |
| 2007/0121538 | A1* | 5/2007 | Ode et al. | 370/323 |
| 2007/0147289 | A1* | 6/2007 | Nibe | 370/329 |

FOREIGN PATENT DOCUMENTS

KR 1020070033115 3/2007

* cited by examiner

*Primary Examiner* — Chi H Pham
*Assistant Examiner* — Kouroush Mohebbi
(74) *Attorney, Agent, or Firm* — The Farrell Law Firm, P.C.

(57) ABSTRACT

A method and apparatus for estimating a velocity of a Mobile Station (MS) in a mobile communication system are provided, in which a Base Station (BS) receives a Channel Quality Indicator (CQI) measured by the MS, calculates a decision metric by calculating variations in the CQI for a predetermined time period, and estimates the velocity of the MS based on the decision metric, referring to a velocity table in which decision metrics are mapped to mobile velocities.

12 Claims, 7 Drawing Sheets

METHOD AND APPARATUS FOR ESTIMATING VELOCITY OF MOBILE STATION USING CHANNEL QUALITY INDICATOR IN A MOBILE COMMUNICATION SYSTEM

PRIORITY

This application claims priority under 35 U.S.C. §119(a) to a Korean Patent Application filed in the Korean Intellectual Property Office on Nov. 28, 2006 and assigned Serial No. 2006-118596, the entire disclosure of which is hereby incorporated by reference.

BACKGROUND OF THE INVENTION

1. Field of the Invention

The present invention generally relates to a method and apparatus for efficiently using system resources in a mobile communication system. More particularly, the present invention relates to a method and apparatus for estimating the velocity of a Mobile Station (MS) without adding overhead.

2. Description of the Related Art

In order to support large-capacity multimedia services within limited frequency and channel resources, a future-generation wireless communication system should allocate system resources based on accurate channel information. Velocity is a very significant factor that determines channel information about a time-variant channel such as a mobile communication channel in the wireless communication system. Since the velocity is information indicating the channel status of a user, it is significant to efficient utilization of system resources.

In real applications, the velocity information of MSs can increase system performance. For example, when it is used in adaptive transmission/reception technology, the velocity information allows for efficient channel estimation at an MS receiver and enables a transmitter to control a modulation and coding scheme or an interleaving method for the MS according to the channel status of the MS. If the velocity information is used in a network-implemented algorithm, an accurate decision can be made on a handover and system resource allocation can be efficiently managed.

The velocity information of the MS can also be utilized in selecting a signal transmission scheme in a BS with a plurality of antennas. For the BS, beamforming, Spatial Division Multiple Access (SDMA), transmit diversity, spatial multiplexing, etc. are available for signal transmission. Among these transmission schemes, beamforming offers a better performance for a low-speed MS, and a Multiple Input Multiple Output (MIMO) scheme such as transmit diversity or spatial multiplexing outperforms the other transmission schemes for a high-speed MS. In this manner, the system capacity can be increased by selecting an appropriate transmission scheme between MIMO and beamforming based on the velocity information of the MS, by the BS.

Conventionally, a mobile velocity estimation technique was proposed to increase the accuracy of channel estimation in the MS receiver. The MS receives a predetermined pilot signal or a constant envelope signal through the receiver and estimates a maximum Doppler frequency based on a variation in the amplitude of the received signal. COVariance (COV) and Level Crossing Rate (LCR) are major examples of this mobile velocity estimation scheme. COV measures the covariance between the amplitudes of two signals spaced by a predetermined time interval and estimates a maximum Doppler frequency using the covariance. LCR measures a rate at which the amplitude of a signal crosses a threshold level for a predetermined time period and estimates a maximum Doppler frequency using the rate.

These conventional velocity estimation methods that estimate a maximum Doppler frequency according to the velocity of an MS are based on the condition that the transmitter of a BS or the MS transmits a pilot signal or a constant envelope signal. If the purpose of the velocity estimation is to increase channel estimation accuracy, the condition is easily fulfilled. However, when the BS needs to estimate the velocity of the MS on the downlink, the MS should transmit an additional uplink signal, i.e., when data is transmitted only on the downlink data transmission, without an uplink data transmission, it is impossible to estimate the velocity of the MS.

Even if the BS uses an uplink control signal that is always transmitted irrespective of the uplink data transmission, it has difficulty in estimating the velocity because the envelope size of the uplink control signal is not constant due to power control. In this case, it can be contemplated that the MS estimates its velocity using a downlink signal and feeds back the velocity, or the MS transmits an additional signal by which the BS can estimate the velocity of the MS. However, these methods have the shortcomings of increased overhead and thus decreased system capacity.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method and apparatus for estimating a velocity of an MS without adding overhead by a BS in a mobile communication system.

Another aspect of exemplary embodiments of the present invention is to provide a method and apparatus for estimating a velocity of an MS in an absence of uplink data traffic by a BS in a mobile communication system.

A further aspect of exemplary embodiments of the present invention is to provide a method and apparatus for estimating a velocity of an MS using a Channel Quality Indicator (CQI) for use in downlink transmission by a BS in a mobile communication system.

In accordance with an aspect of exemplary embodiments of the present invention, there is provided a method for estimating a velocity of an MS in a mobile communication system, in which a CQI measured by the MS is received from the MS, a decision metric is calculated by calculating variations in the CQI for a predetermined time period, and the velocity of the MS is estimated based on the decision metric, referring to a velocity table in which decision metrics are mapped to mobile velocities.

In accordance with another aspect of exemplary embodiments of the present invention, there is provided an apparatus for estimating a velocity of an MS in a mobile communication system, in which a receiver receives a CQI measured by the MS and sent from the MS, and a velocity estimator calculates a decision metric by calculating variations in the CQI for a predetermined time period, and estimates the velocity of the MS based on the decision metric, referring to a velocity table in which decision metrics are mapped to mobile velocities.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique in which a BS estimates the velocity of an MS using a CQI that the MS typically transmits on the uplink, without requiring an additional feedback from the MS. During the movement of the MS, as a Doppler frequency changes, a CQI that the MS transmits also changes. The BS can estimate the velocity of the MS by measuring the variation of the CQI over time.

In the present invention, the BS uses the CQI received from the MS in estimating the velocity of the MS. The CQI includes a Signal-to-Interference and Noise Ratio (SINR) of a downlink data traffic signal measured at the MS. The SINR can be used for Adaptive Modulation and Coding (AMC), scheduling, and handover in the BS. Since the MS periodically transmits the CQI, even in the absence of uplink transmission data, the BS can estimate the velocity of the MS based on the CQI. Considering the CQI is affected by uplink power control, the conventional technologies are not effective in estimating the velocity of the MS. In this context, for velocity estimation, the present invention measures a CQI variation rather than uses the received CQI as it is.

Figure 1:
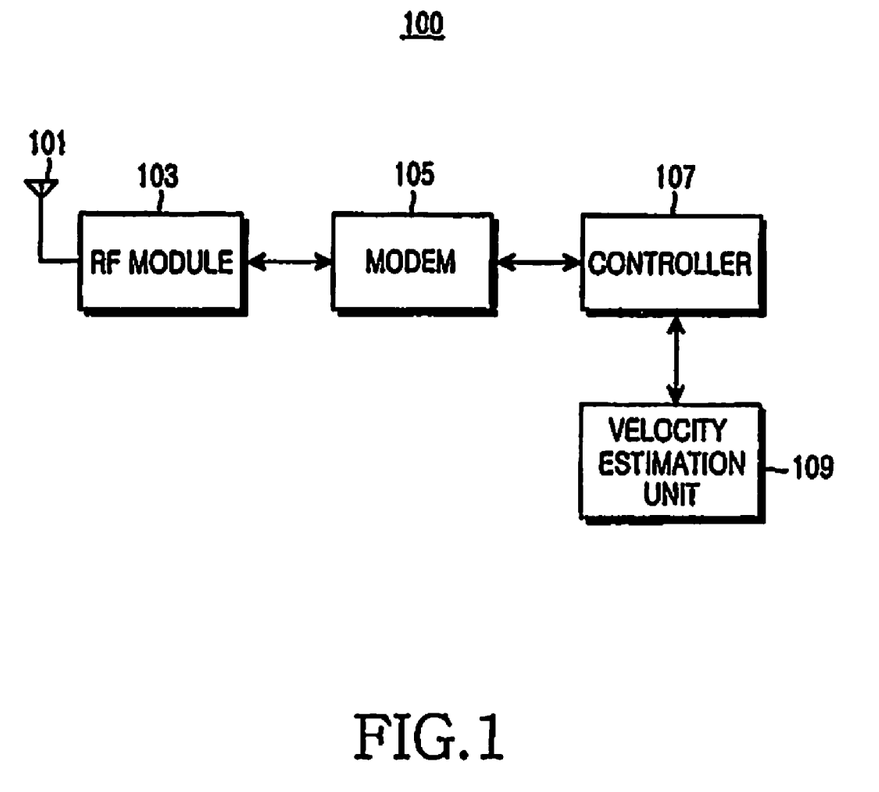
FIG. 1 is a block diagram of a BS apparatus for estimating the velocity of an MS according to an exemplary embodiment of the present invention.

FIG. 1 is a block diagram of a BS apparatus 100 for estimating the velocity of an MS according to an exemplary embodiment of the present invention.

Referring to FIG. 1, the BS apparatus 100 includes an antenna 101, a Radio Frequency (RF) module 103 for RF-processing a signal such as frequency upconversion/downconversion, a MOdulator/DEModulator (MODEM) 105 for modulating/demodulating and encoding/decoding a transmission/received signal, and a controller 107 for allocating radio resources to MSs and controlling transmission/reception of traffic to/from the MSs. The controller 107 receives a CQI periodically from an MS that has received a downlink signal and controls AMC, scheduling and handover for the MS based on the CQI. The RF module 103, the MODEM 105, and the controller 107 collectively form a CQI receiver.

The BS apparatus 100 further includes a velocity estimation unit 109 for measuring a variation in the received CQI and estimating the velocity of the MS using the CQI variation and a predetermined velocity table. In the velocity table, the CQI variation is mapped to a mobile velocity, for example, low or high. More specific CQI variations are defined and thus can be mapped to more mobile velocities.

As the CQI measured regarding downlink data traffic changes over time due to a movement-caused Doppler frequency, the BS can estimate the velocity of the MS by measuring the variation of the CQI. The CQI variation-based velocity estimation takes place in the velocity estimation unit 109 of FIG. 1 and is realized in the following two exemplary embodiments of the present invention.

First Embodiment

The BS measures the CQI difference between every two adjacent frames, calculates a decision metric by averaging the CQI differences, and estimates the velocity of the MS using the decision metric and a velocity table with decision metrics mapped to mobile velocities.

Figure 2:
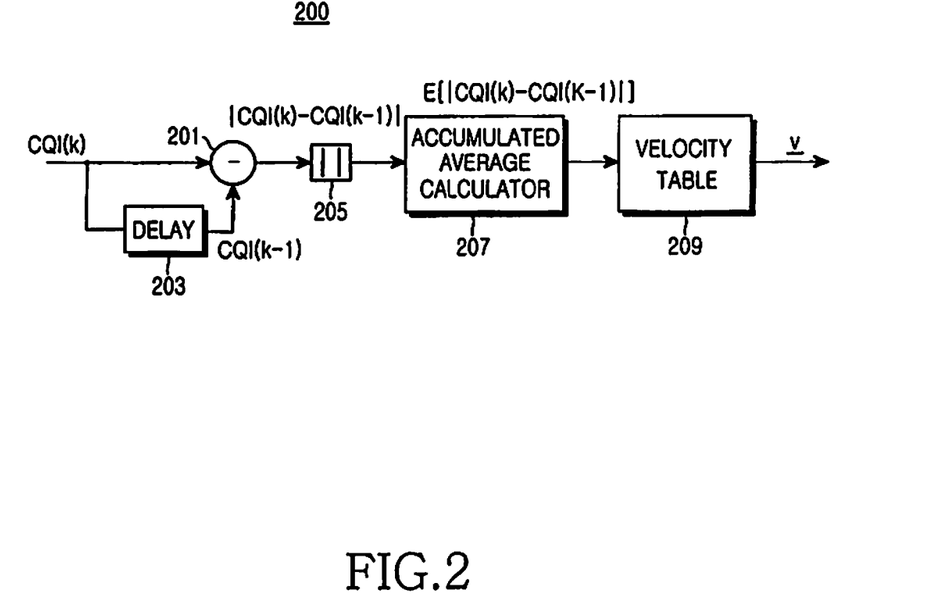
FIG. 2 is a block diagram of a velocity estimator for estimating the velocity of an MS, by the BS, according to a first exemplary embodiment of the present invention.
Figure 3A:
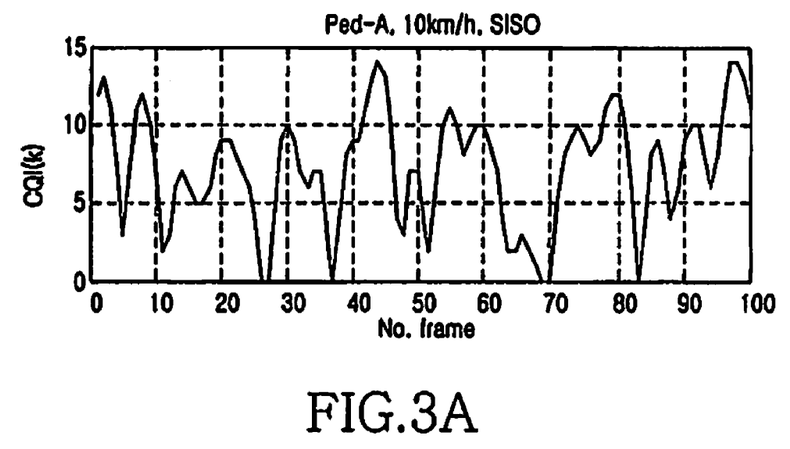
FIGS. 3A and 3B are graphs illustrating an operation for calculating a decision metric by accumulating a CQI difference between every adjacent frames and averaging the accumulated CQI difference according to the first exemplary embodiment of the present invention.
Figure 3B:
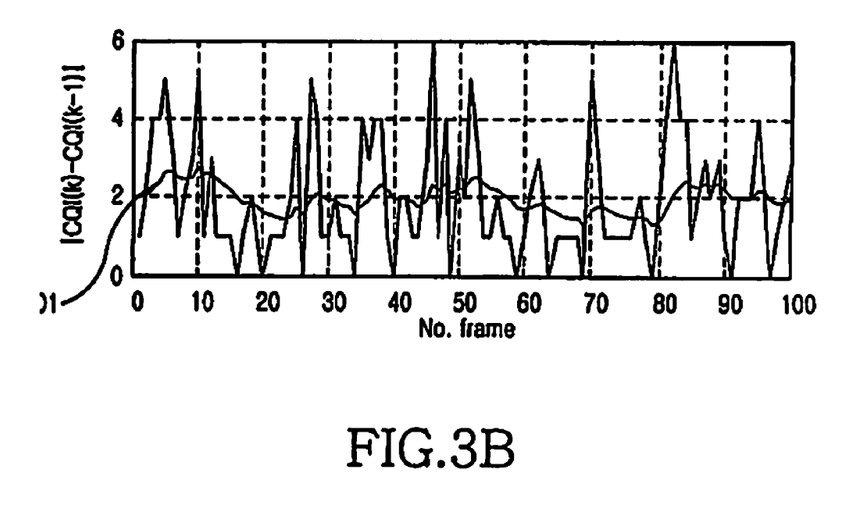
Figure 4:
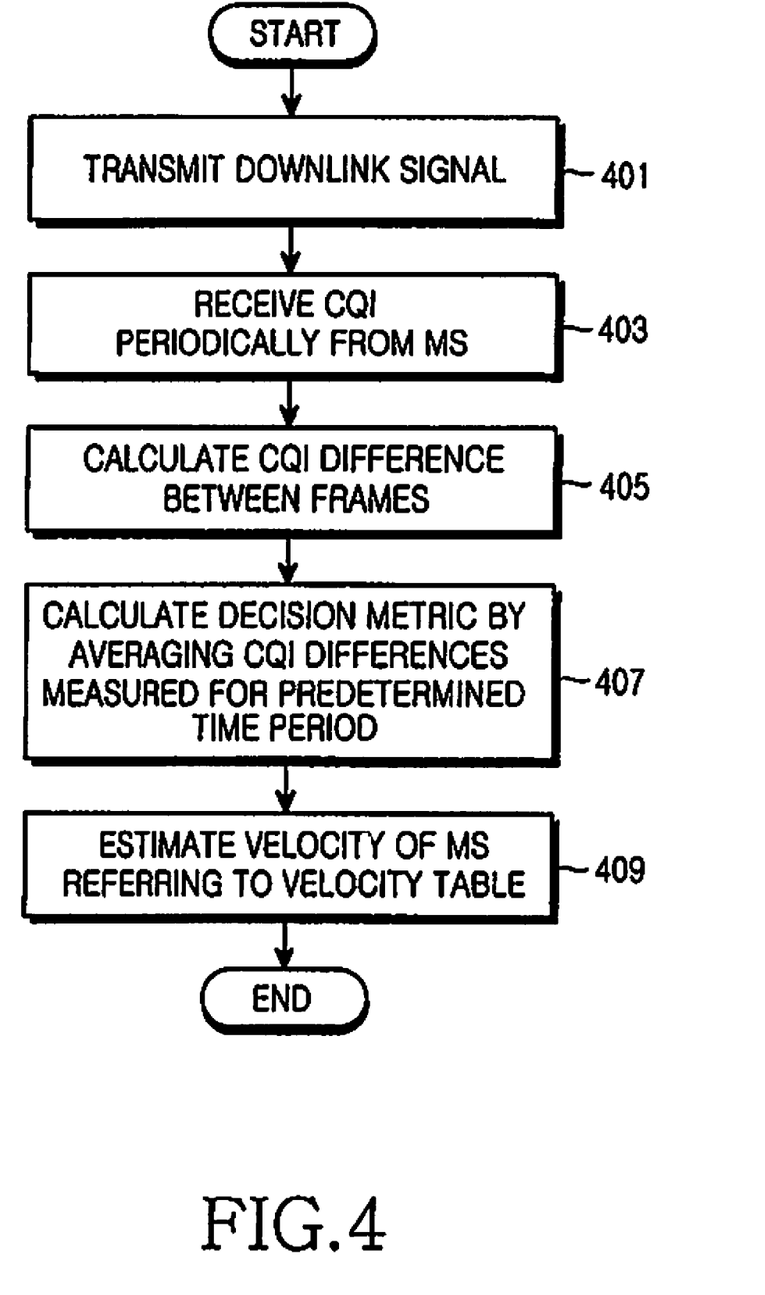
FIG. 4 is a flowchart of a method for estimating the velocity of an MS, by the BS, according to the first exemplary embodiment of the present invention.

With reference to FIGS. 2 to 4, a first exemplary embodiment of the present invention will be described.

FIG. 2 is a block diagram of a velocity estimator 200 for estimating the velocity of an MS, by the BS, according to a first exemplary embodiment of the present invention. The velocity estimator 200 is provided in the velocity estimation unit 109 illustrated in FIG. 1.

Referring to FIG. 2, a subtractor 201 calculates the CQI difference between frame k and frame (k−1) received from a delay 203. An absolute value calculator 205 calculates the absolute value of the CQI difference. An accumulated average calculator 207 accumulates the absolute values of CQI differences for a predetermined time period and calculates a decision metric by averaging the accumulated absolute value. A velocity table 209 detects a preset mobile velocity mapped to the decision metric and outputs the preset mobile velocity as a velocity estimate.

The velocity table separates mobile velocities into levels according to the transmission scheme of the BS. For example, if the BS defines two levels of mobile velocities, for example, low and high, the velocity table can be given as Table 1 below.

TABLE 1

| Decision metric ($\gamma$) | Mobile velocity |
|---|---|
| $\gamma < 1.57$ | Low (below 30 km/h) |
| $\gamma \geq 1.57$ | High (at or above 30 km/h) |

If the BS defines five levels of mobile velocities, for example, pedestrian/low/medium/high/ultra high, the velocity table can be given as Table 2 below.

TABLE 2

| Decision metric (γ) | Mobile velocity |
|---|---|
| γ < 0.61 | Pedestrian (0 km/h~10 km/h) |
| 0.61 ≦ γ < 1.57 | Low (10 km/h~30 km/h) |
| 1.57 ≦ γ < 3.16 | Medium (30 km/h~80 km/h) |
| 3.16 ≦ γ < 5.23 | High (80 km/h~120 km/h) |
| γ ≧ 5.23 | Ultra high (at or above 120 km/h) |

That is, the BS forms the velocity table by mapping its defined mobile velocity levels to decision metrics.

FIGS. 3A and 3b are graphs illustrating an operation for calculating a decision metric by accumulating the CQI difference between every adjacent frame and averaging the accumulated CQI difference according to the first exemplary embodiment of the present invention. Specifically, FIG. 3A illustrates CQI variations in frames, and FIG. 3B illustrates the averages of the CQI variations for the frames. A decision metric 301 is calculated by accumulating averaged CQI differences for a predetermined time period.

FIG. 4 is a flowchart of a method for estimating the velocity of an MS, by the BS, according to the first exemplary embodiment of the present invention.

Referring to FIG. 4, the BS transmits a downlink signal to the MS in step 401 and receives a CQI from the MS that has received downlink signal in step 403. The CQI is periodically transmitted to the BS. The BS measures the CQI difference between every adjacent frame, in step 405, and calculates a decision metric γ by averaging the absolute values of the CQI differences by Equation (1) in step 407.

$$\gamma = E\{|CQI(k) - CQI(k-1)|\} \quad (1)$$

where k denotes the sequence number of a frame and γ denotes the decision metric.

The decision metric is the average of CQI differences measured for a predetermined time period. The decision metric of frame k, γ(k) is computed by Equation (2):

$$\gamma(k) = \alpha\gamma(k-1) + (1-\alpha)|CQI(k) - CQI(k-1)| \quad (2)$$

where α denotes a weight value serving as a forgetting factor that reduces a rapid variation in the decision metric for a short term.

In step 409, the BS estimates the velocity of the MS by detecting a mobile velocity mapped to the decision metric in the velocity table. In accordance with the velocity estimation method illustrated in FIG. 4, the BS can estimate the velocity of the MS using the CQI that the MS periodically transmits without requiring an additional feedback.

Second Embodiment

The BS tracks a variation in the CQI received from the MS and measures an LCR at which the CQI variation crosses a predetermined level and estimates the velocity of the MS based on the LCR referring to a velocity table with LCRs mapped to mobile velocities.

Figure 5:
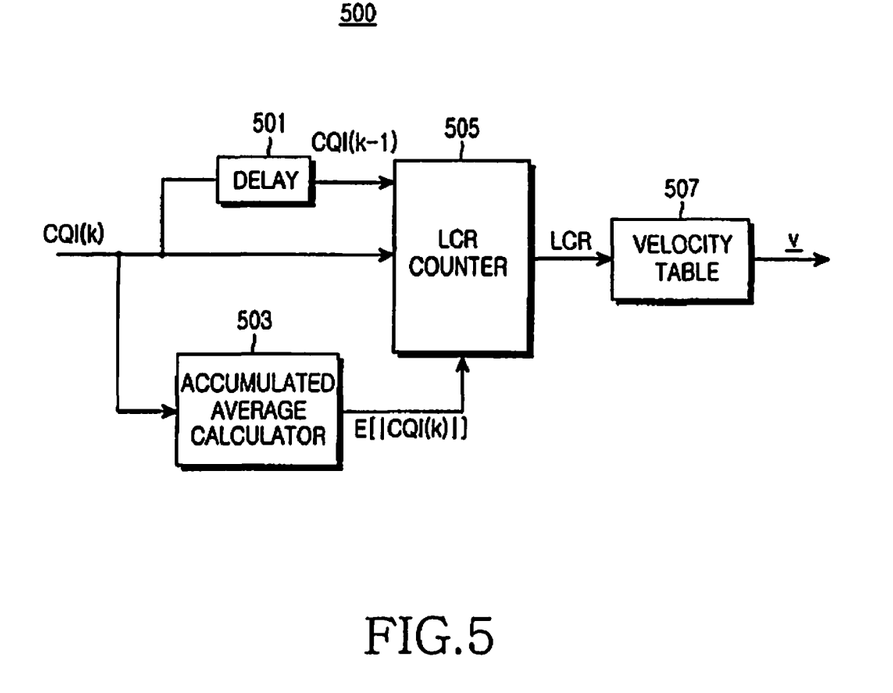
FIG. 5 is a block diagram of a velocity estimator for estimating the velocity of an MS, by the BS, according to a second exemplary embodiment of the present invention.
Figure 6A:
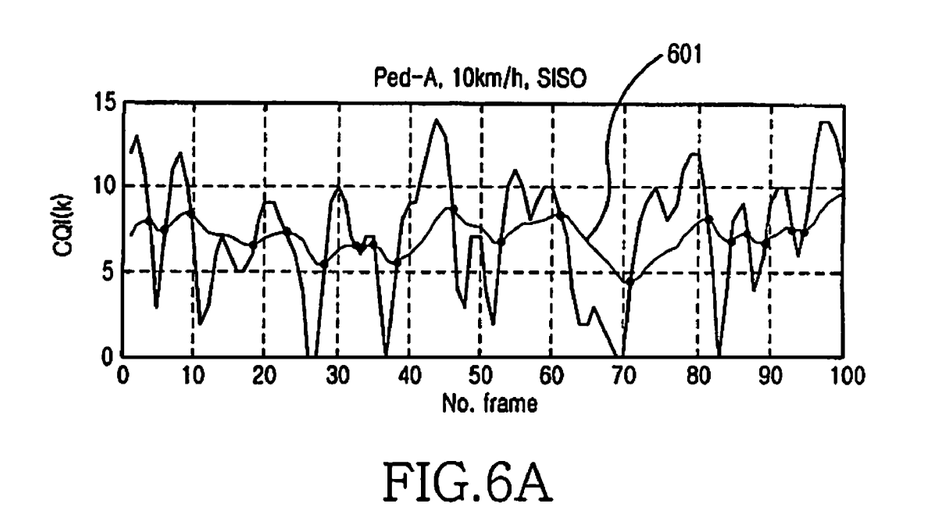
FIGS. 6A and 6B are graphs illustrating an operation for calculating a decision metric by counting a number (i.e., an LCR) of frames whose CQI variations cross a predetermined level according to the second exemplary embodiment of the present invention.
Figure 6B:
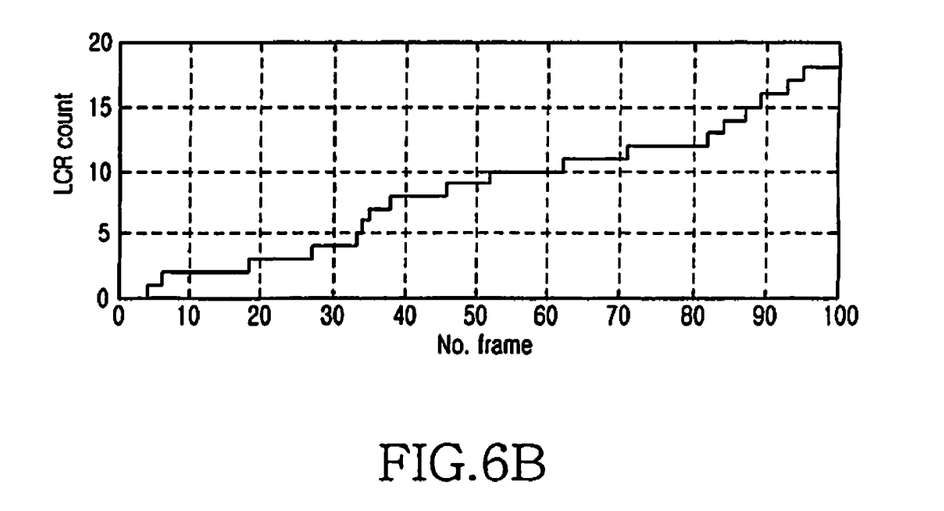
Figure 7:
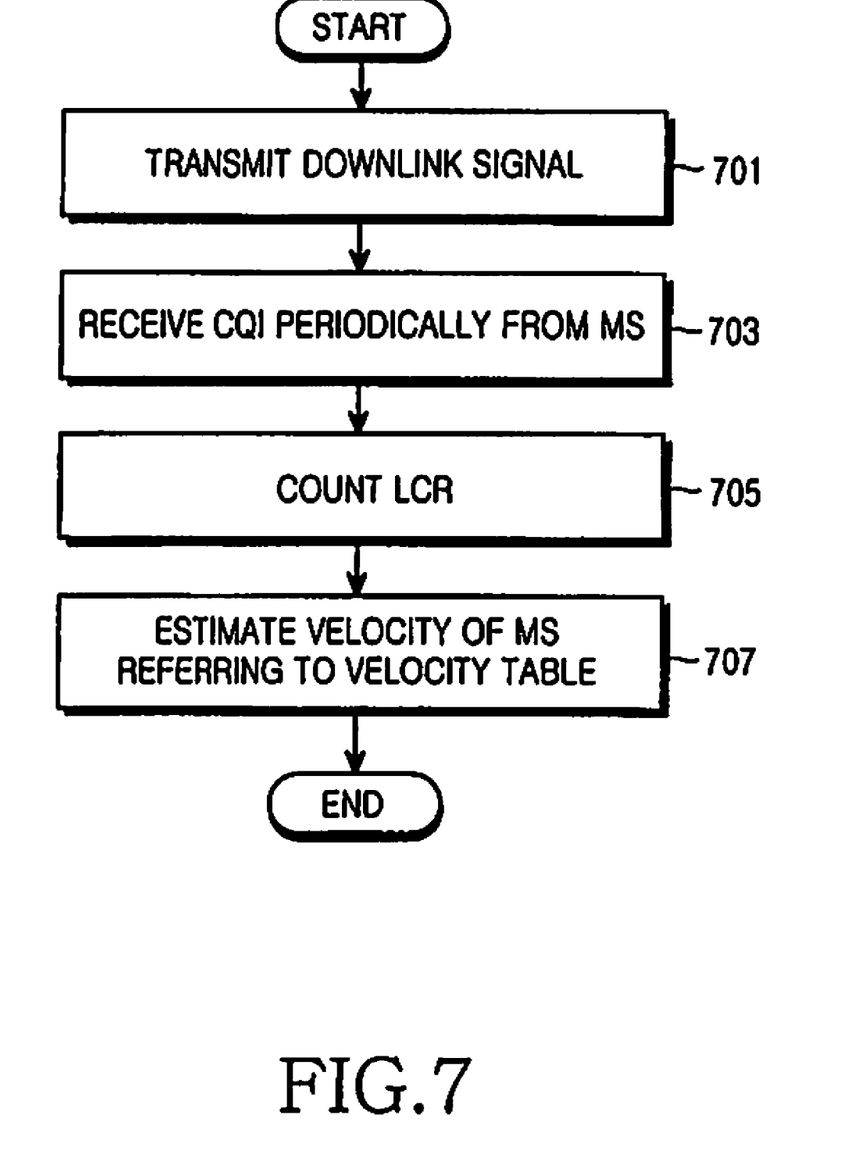
FIG. 7 is a flowchart of a method for estimating the velocity of an MS, by the BS, according to the second exemplary embodiment of the present invention.

With reference to FIGS. 5 to 7, a second exemplary embodiment of the present invention will be described.

FIG. 5 is a block diagram of a velocity estimator 500 for estimating the velocity of an MS, by the BS, according to the second exemplary embodiment of the present invention. The velocity estimator 500 is provided in the velocity estimation unit 109 illustrated in FIG. 1.

Referring to FIG. 5, the CQI of frame k, the CQI of frame (k-1) from a delay 501, and an accumulated CQI for a predetermined time period from an accumulated average calculator 503 are provided to an LCR counter 505. The LCR counter 505 generates a decision metric by counting an LCR using the three inputs for a predetermined time period. A velocity table 507 outputs a mobile velocity mapped to the decision metric as a velocity estimate. The velocity table is formed in a similar manner to that used in the first exemplary embodiment of the present invention, except that the range of decision metrics is different.

FIGS. 6A and 6B are graphs illustrating an operation for calculating a decision metric by counting an LCR according to the second exemplary embodiment of the present invention. Specifically, FIG. 6A illustrates CQI variations in frames, and FIG. 6B illustrates LCR counts for the frames. Reference numeral 601 denotes a predetermined level (i.e. a threshold level) by which an LCR is counted.

FIG. 7 is a flowchart of a method for estimating the velocity of an MS, by the BS, according to the second exemplary embodiment of the present invention.

Referring to FIG. 7, the BS transmits a downlink signal to the MS in step 701 and receives a CQI from the MS that has received downlink signal in step 703. The CQI is periodically transmitted to the BS. The BS counts an LCR at which a CQI variation for a predetermined time period satisfies Equation (3) with respect to a predetermined level Γ.

$$CQI(k) < \Gamma < CQI(k-1) \text{ or } CQI(k-1) > \Gamma > CQI(k) \quad (3)$$

where Γ is a predetermined value or the average of CQIs for a given time period, expressed as Equation (4):

$$\Gamma(k) = \alpha\Gamma(k-1) + (1-\alpha)CQI(k) \quad (4)$$

In Equation (3) and Equation (4), α denotes a weight value serving as a forgetting factor that reduces a rapid variation in the decision metric for a short term.

In step 707, the BS estimates the velocity of the MS by detecting a mobile velocity mapped to the decision metric (i.e. LCR) in the velocity table. In accordance with the velocity estimation method illustrated in FIG. 7, the BS can estimate the velocity of the MS using the CQI that the MS periodically transmits without requiring an additional feedback.

In general, the CQI differs in fluctuation according to diversity or average SINR. In this context, the first exemplary embodiment of the present invention is CQI variation-sensitive, whereas the second exemplary embodiment of the present invention is robust against the degree of CQI variation. If a CQI variation is small, the first exemplary embodiment of the present invention is chosen and if the CQI variation is large, the second exemplary embodiment of the present invention is chosen, for mobile velocity estimation. A criterion that classifies a CQI variation as large or small can be decided empirically.

The exemplary embodiments of the present invention can be used for selecting MIMO or beamforming in the BS. For example, if the BS transmits a broadcasting signal including a preamble, the MS calculates a CQI by estimating channel status after receiving the broadcasting signal. An Orthogonal Frequency Division Multiple Access (OFDMA) communication system such as Wireless Broadband (WiBro) may calculate the SINRs of a total frequency band using the preamble or the SINRs of frequency bands using pilot signals in the frequency bands, as a CQI. Once the MS determines a CQI, it feeds back the CQI and the BS estimates the velocity of the MS using the received CQI in the above-described exemplary embodiments of the present invention.

If the velocity of the MS is classified as high, the BS transmits data to the MS by MIMO. If the velocity of the MS is classified as slow, the BS transmits data to the MS by beamforming. A method for determining a threshold to be compared with a decision metric for the WiBro system will be described in relation to the second exemplary embodiment of the present invention. The threshold can be set in the velocity table. When the forgetting factor is set to 0.95 in the WiBro system, the averages of LCRs for 200 frames (1 second) under various channel environments are given in Table 3 below.

TABLE 3

| Ant. Conf. | Channel | SINR | Velocity | | |
|---|---|---|---|---|---|
| | | | 3 km/h | 10 km/h | 30 km/h |
| 1 × 1 (SISO) | Ped. A | −2 dB | 12.47 | 38.48 | 90.92 |
| | | 5 dB | 14.82 | 44.27 | 98.04 |
| | Ped. B | −2 dB | 13.61 | 41.40 | 93.71 |
| | | 5 dB | 14.65 | 43.14 | 97.52 |
| 1 × 2 (SIMO) | Ped. A | −2 dB | 13.45 | 41.75 | 88.59 |
| | | 5 dB | 16.11 | 47.15 | 98.10 |
| | Ped. B | −2 dB | 14.16 | 43.15 | 93.54 |
| | | 5 dB | 14.71 | 42.92 | 96.14 |
| 4 × 2 (MIMO) | Ped. A | −2 dB | 13.28 | 42.11 | 90.48 |
| | | 5 dB | 16.62 | 47.85 | 98.13 |
| | Ped. B | −2 dB | 14.36 | 44.27 | 91.08 |
| | | 5 dB | 14.54 | 42.76 | 92.80 |

If a mobile velocity at which MIMO performs as well as beamforming, that is, a mobile velocity that separates low velocities from high velocities is 3 km/h, the threshold is 15. If an LCR that separates low velocities from high velocities is 10 km/h or 30 km/h, the threshold is 43 or 95. A margin can be given to the threshold. A mobile velocity and a threshold that separate slow velocities from high velocities can be optimized during system configuration and implementation.

As described above, conventionally, the MS estimates its velocity and feeds back the velocity to the BS, or the BS estimates the velocity of the MS using a periodical pilot signal designated for velocity estimation even in the absence of uplink transmission data. Therefore, there is no way in avoiding additional overhead. In contrast, the present invention measures a variation in a typically received CQI and estimates the velocity of the MS using the CQI variation, thereby causing no additional overhead. The principle of the present invention can improve performance as it enables additional use of the mobile velocity in the scenarios of scheduling and handover.

As is apparent from the above description, the present invention can advantageously enable a BS to estimate the velocity of an MS by measuring variations in a CQI periodically received from the MS, thus imposing no additional overhead.

The present invention can be applied in estimating a mobile velocity to select MIMO or beamforming in a BS using multiple antennas.

Furthermore, mobile velocities must be simply classified as low, medium, and high without a more precise velocity estimation, this classification can be achieved by modifying a control algorithm of the BS without requiring an additional capacity overhead and hardware implementation in a MODEM.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for estimating a velocity of a Mobile Station (MS) by a Base Station (BS) in a mobile communication system, comprising:
   receiving, by the BS, a plurality of Channel Quality Indicators (CQIs) from the MS;
   acquiring a decision metric using variations of the plurality of CQIs for a predetermined time period; and
   estimating the velocity of the MS based on the decision metric by referring to a velocity table in which decision metric ranges are mapped to mobile velocities;
   wherein the velocity table separates the mobile velocities into levels according to a transmission scheme of the BS, and
   wherein the decision metric is acquired by calculating an accumulated average of the variations of the plurality of CQIs for the predetermined time period, or is acquired by counting a Level Crossing Rate (LCR) at which a CQI variation crosses a predetermined level.

2. The method of claim 1, wherein the accumulated average comprises:
   an accumulated average of CQI differences between adjacent frames for the predetermined time period.

3. The method of claim 1, further comprising:
   comparing the estimated velocity with a predetermined boundary velocity; and
   applying one of a Multiple Input Multiple Output (MIMO) scheme and a beamforming scheme as a downlink transmission scheme to the MS, according to a result of the comparison.

4. The method of claim 1, wherein acquiring the decision metric comprises multiplying the decision metric by a weight value reflecting a variation of the decision metric.

5. The method of claim 3, wherein applying one of the MIMO scheme and the beamforming scheme comprises applying the beamforming scheme to the MS, if the estimated velocity is lower than the predetermined boundary velocity.

6. The method of claim 3, wherein applying one of the MIMO scheme and the beamforming scheme comprises applying the MIMO scheme to the MS, if the estimated velocity is higher than the predetermined boundary velocity.

7. A Base Station (BS) for estimating a velocity of a Mobile Station (MS) in a mobile communication system, comprising:
   a receiver for receiving a plurality of Channel Quality Indicators (CQIs) from the MS; and
   a velocity estimator for acquiring a decision metric using variations of the plurality of CQIs for a predetermined time period, and estimating the velocity of the MS based on the decision, metric by referring to a velocity table in which decision metric ranges are mapped to mobile velocities;
   wherein the velocity table separates the mobile velocities into levels according to a transmission scheme of the BS, and
   wherein the decision metric is acquired by calculating an accumulated average of the variations of the plurality of CQIs for the predetermined time period, or is acquired by counting a Level Crossing Rate (LCR) at which a CQI variation crosses a predetermined level.

8. The BS of claim 7, wherein the accumulated average comprises an accumulated average of CQI differences between adjacent frames for the predetermined time period.

9. The BS of claim 7, further comprising a controller for comparing the estimated velocity with a predetermined boundary velocity, and applying one of a Multiple Input Multiple Output (MIMO) scheme and a beamforming scheme as a downlink transmission scheme to the MS, according to a result of the comparison.

10. The BS of claim 7, wherein the velocity estimator multiplies the decision metric by a weight value reflecting a variation of the decision metric.

11. The BS of claim 9, wherein the controller applies the beamforming scheme to the MS, if the estimated velocity is lower than the predetermined boundary velocity.

12. The BS of claim 9, wherein the controller applies the MIMO scheme to the MS, if the estimated velocity is higher than the predetermined boundary velocity.

* * * * *